(12) United States Patent
Tang et al.

(10) Patent No.: US 11,757,622 B2
(45) Date of Patent: Sep. 12, 2023

(54) DETERMINING A CHANGE TO PRODUCT INFORMATION OR USER INFORMATION VIA HASHING

(71) Applicant: Capital One Services, LLC, McLean, VA (US)

(72) Inventors: Qiaochu Tang, McLean, VA (US); Micah Price, McLean, VA (US); Stephen Wylie, McLean, VA (US); Geoffrey Dagley, McLean, VA (US); Jason Hoover, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 48 days.

(21) Appl. No.: 17/451,719

(22) Filed: Oct. 21, 2021

(65) Prior Publication Data

US 2022/0045847 A1   Feb. 10, 2022

Related U.S. Application Data

(63) Continuation of application No. 16/541,905, filed on Aug. 15, 2019, now Pat. No. 11,165,561, which is a continuation of application No. 16/287,182, filed on Feb. 27, 2019, now Pat. No. 10,396,980.

(51) Int. Cl.
*G06F 7/00* (2006.01)
*H04L 9/06* (2006.01)
*G06N 20/00* (2019.01)
*H04L 67/306* (2022.01)
*G06Q 30/0601* (2023.01)

(52) U.S. Cl.
CPC ........... *H04L 9/0643* (2013.01); *G06N 20/00* (2019.01); *G06Q 30/0627* (2013.01); *H04L 67/306* (2013.01)

(58) Field of Classification Search
CPC ..... H04L 9/0643; H04L 67/306; G06N 20/00; G06Q 30/0627
USPC .................................................. 707/600–899
See application file for complete search history.

(56) References Cited

U.S. PATENT DOCUMENTS

| | | | |
|---|---|---|---|
| 8,856,090 B1 | 10/2014 | Honner | |
| 10,396,980 B1 | 8/2019 | Tang et al. | |
| 11,165,561 B2 | 11/2021 | Tang et al. | |
| 2008/0140577 A1 | 6/2008 | Rahman et al. | |
| 2013/0144762 A1* | 6/2013 | Nguyen | G06Q 30/0613 705/26.81 |

* cited by examiner

*Primary Examiner* — Isaac M Woo
(74) *Attorney, Agent, or Firm* — Harrity & Harrity, LLP

(57) ABSTRACT

A device may determine a price of a product based on first information concerning attributes of the product, and provide the price for display by a user device. The device may generate first hash values based on the first information, where a particular first hash value is associated with a particular attribute, and generate a first bit-string that includes the plurality of first hash values. The device may generate second hash values based on second information concerning the attributes of the product, where a particular second hash value is associated with the particular attribute. The device may generate a second bit-string that includes the second hash values, and determine a change to the particular attribute based on the first bit-string and the second bit-string. The device may determine a new price of the product based on the change, and provide the new price for display by the user device.

20 Claims, 10 Drawing Sheets

DETERMINING A CHANGE TO PRODUCT INFORMATION OR USER INFORMATION VIA HASHING

RELATED APPLICATIONS

This application is a continuation of U.S. patent application Ser. No. 16/541,905, filed Aug. 15, 2019 (now U.S. Pat. No. 11,165,561), which is a continuation of U.S. patent application Ser. No. 16/287,182, filed Feb. 27, 2019 (now U.S. Pat. No. 10,396,980), which are incorporated herein by reference in their entireties.

BACKGROUND

A customer may shop for a product using a user device (e.g., by using an application executing on the user device). The user device may display a price estimate for the product.

SUMMARY

According to some possible implementations, a method may include receiving, by a server device, a message indicating an interest of a user in a product. The method may include obtaining, by the server device, first information concerning a plurality of attributes of the product, determining, by the server device, a price of the product based on the first information, and causing, by the server device, display of the price by a user device. The method may include generating, by the server device, two or more first hash values based on the first information, wherein a particular first hash value of the two or more first hash values is associated with a particular attribute of the plurality of attributes, and generating, by the server device, a first bit-string that includes the two or more first hash values. The method may include obtaining, by the server device and after generating the first bit-string, second information concerning the plurality of attributes of the product, and generating, by the server device, two or more second hash values based on the second information, wherein a particular second hash value of the two or more second hash values is associated with the particular attribute of the plurality of attributes. The method may include generating, by the server device, a second bit-string that includes the two or more second hash values, and determining, by the server device, a change to an attribute of the plurality of attributes based on the first bit-string and the second bit-string. The method may include determining, by the server device, a new price of the product based on the change to the attribute, and causing, by the server device, display of the new price and the change by the user device.

According to some possible implementations, a device may include one or more memories, and one or more processors, communicatively coupled to the one or more memories, to cause a user device to prompt a user to identify a product of interest to the user, and to receive a message indicating the product. The one or more processors may obtain first information concerning a plurality of attributes of the product, may determine a price of the product based on the first information, and may provide the price for display by the user device. The one or more processors may generate a plurality of first hash values based on the first information, wherein a particular first hash value of the plurality of first hash values is associated with a particular attribute of the plurality of attributes, and may generate a first bit-string that includes the plurality of first hash values. The one or more processors may obtain, after generating the first bit-string, second information concerning the plurality of attributes of the product, and may generate a plurality of second hash values based on the second information, wherein a particular second hash value of the plurality of second hash values is associated with the particular attribute of the plurality of attributes. The one or more processors may generate a second bit-string that includes the plurality of second hash values, and may determine a change to the particular attribute of the plurality of attributes based on the first bit-string and the second bit-string. The one or more processors may determine a new price of the product based on the change to the particular attribute, and may provide, for display by the user device, the new price and information regarding the change.

According to some possible implementations, a non-transitory computer-readable medium may store instructions that include one or more instructions that, when executed by one or more processors of a device, cause the one or more processors to receive a plurality of messages concerning a plurality of interests of a plurality of users in a plurality of products, wherein a message, of the plurality of messages, indicates an interest, of the plurality of interests, of a user, of the plurality of users, in a product of the plurality of products. The one or more instructions may cause the one or more processors to obtain first information concerning a plurality of attributes of the product, to determine a price of the product based on the first information, and to cause display of the price by a user device of a plurality of user devices. The one or more instructions may cause the one or more processors to generate two or more first hash values based on the first information, wherein a particular first hash value of the two or more first hash values is associated with a particular attribute of the plurality of attributes, and to generate a first bit-string that includes the two or more first hash values. The one or more instructions may cause the one or more processors to obtain second information concerning the plurality of attributes of the product, and to generate two or more second hash values based on the second information, wherein a particular second hash value of the two or more second hash values is associated with the particular attribute, of the plurality of attributes. The one or more instructions may cause the one or more processors to generate a second bit-string that includes the two or more second hash values, and to determine a change to the particular attribute, of the plurality of attributes, based on comparing the first bit-string and the second bit-string. The one or more instructions may cause the one or more processors to determine a new price of the product based on the change to the particular attribute, and to cause display of the new price and the change by the user device.

DETAILED DESCRIPTION

Figure 1A:
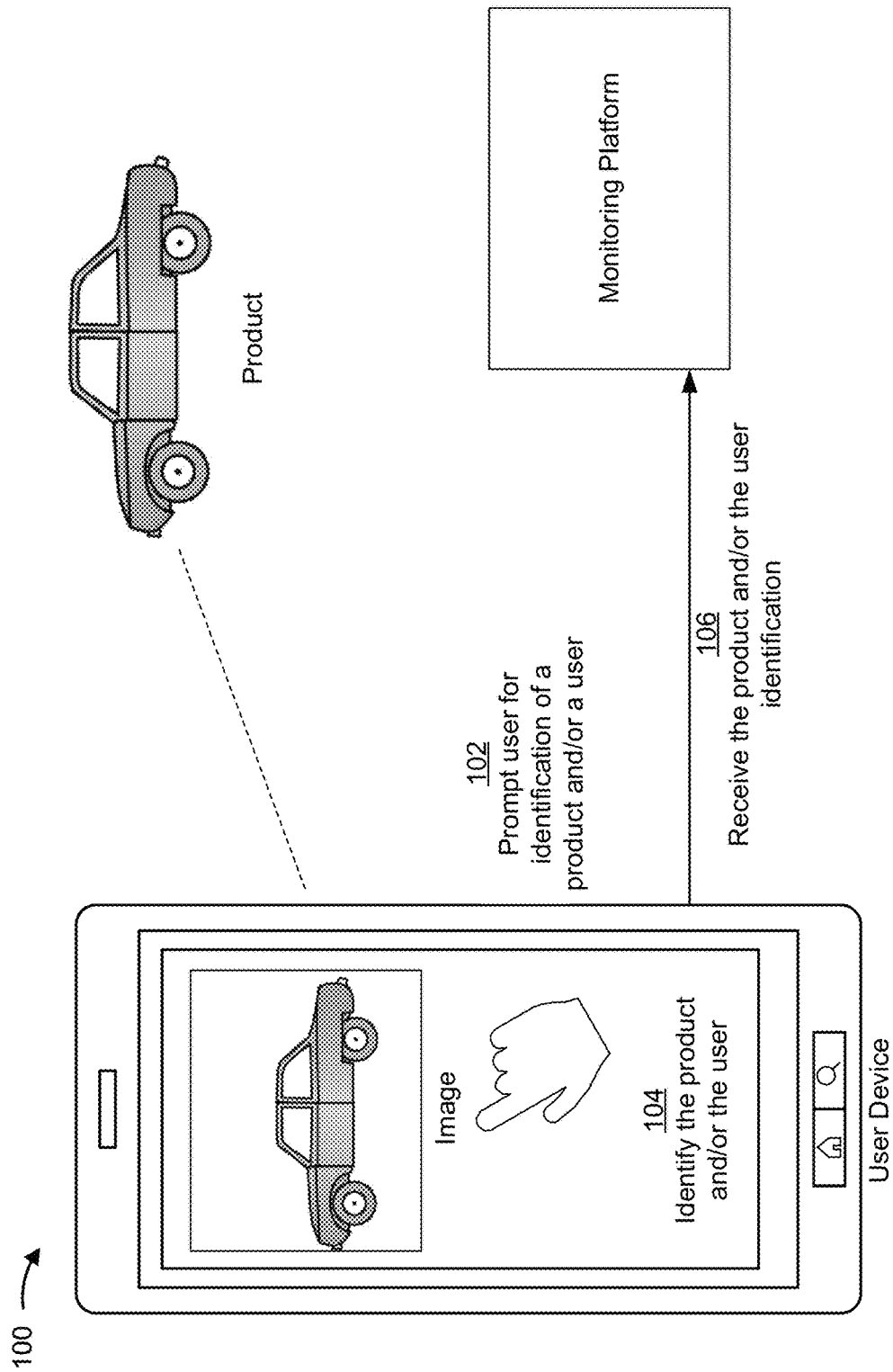
FIGS. 1A-1E are diagrams of an example implementation described herein.

The following detailed description of example implementations refers to the accompanying drawings. The same reference numbers in different drawings may identify the same or similar elements.

A user may use a user device to shop for a product (e.g., via an application executed by the user device). The user device may display a price estimate for a product that the user views on the user device. In some cases, the price estimate is dependent on product information and user information. For example, for a vehicle, the price (e.g., a monthly payment amount) may depend on one or more attributes of the vehicle (e.g., a type of the vehicle, an age of the vehicle, a mileage of the vehicle, a trim of the vehicle, and/or the like) and/or financial-related information of the user (e.g., a salary of the user, an employment status of the user, a bankruptcy status of the user, and/or the like). In some cases, the product information and/or the user information may change before the user tries to finalize a purchase of the product. For example, after the price estimate is displayed, a dealer may update product information concerning a mileage and or an accident history associated with a vehicle and/or a user may update user information associated with a marriage status of the user. Notably, a change to the product information and/or the user information may change the final price of the product, thereby rendering the price estimate incorrect. This may result in the user not finalizing the purchase of the product.

Some implementations described herein provide a monitoring platform that is capable of determining a change to product information and/or user information, based on a hashing technique, and notifying a user of the change. In some implementations, the monitoring platform may obtain the product information and/or the user information to determine a price of a product and cause display of the price on a user device. In some implementations, the monitoring platform may generate product information hash values and/or user information hash values and may generate a product information bit-string that includes the product information hash values and/or a user information bit-string that includes the user information hash values. In some implementations, the monitoring platform may obtain new product information and/or new user information, may generate new product information hash values and/or new user information hash values, and may generate a new product information bit-string that includes the new product information hash values and/or a new user information bit-string that includes the new user information hash values. In some implementations, the monitoring platform may determine a change to the product information based on the product information bit-string and the new product information bit-string. In some implementations, the monitoring platform may determine a change to the user information based on the user information bit-string and the new user information bit-string. In some implementations, the monitoring platform may determine a new price of the product based on the change and may cause the user device to display the new price and/or the change.

In this way, the monitoring platform provides a computer-based system to intelligently provide notice to the user regarding a change to product information and/or user information that may affect the price of the product. This may improve the quality of the information that the user has to determine whether to finalize the purchase of the product. This may reduce the amount of time that the user has to spend shopping and comparing products, budgeting for purchasing the product, communicating with banks, lending institutions, credit unions, and/or the like regarding loan and/or financing terms, and/or the like. This may also increase a likelihood of the purchase of the product by the user, which may increase a seller's sales and/or revenue and decrease costs associated with maintaining products in inventory or product advertising.

This may also conserve user device resources (e.g., processing resources, memory resources, power resources, and/or the like) that the user would otherwise use to shop and compare products, budget for purchasing the product, communicate with banks, lending institutions, credit unions, and/or the like regarding loan and/or financing terms, search for alternative products of interest using the user device, and/or the like. This may also conserve networking resources that would otherwise be used to facilitate the shopping and comparing, the budgeting, the communicating, the searching, and/or the like.

Further, utilizing hash values and bit-strings may optimize the structure and use of databases that store the product information and/or the user information. For example, in some implementations, the product information or the user information may be represented by a bit-string stored in a single field of a database rather than as multiple discrete information elements stored in multiple discrete fields. This may allow for broader partitioning in distributed database technologies and may allow the monitoring platform to perform basic comparisons to determine a change in the product information or the user information, which may conserve processing resources, memory resources, power resources, and/or the like of the database.

Several different stages of obtaining product information and/or user information, determining a price of a product, generating hash values and bit-strings associated with the product information and/or user information, determining a change in the product information and/or the user information based on the hash values and the bit-strings, determining a new price of the product, and alerting a user of the change and/or new price are automated and the monitoring platform may determine numerous (e.g., hundreds, thousands, millions, and/or the like) actions at the same time. This may remove human subjectivity and waste from the process and may improve speed and efficiency of the process and conserve computing resources (e.g., processor resources, memory resources, and/or the like). Furthermore, implementations described herein use a rigorous, computerized process to perform tasks or activities that were not previously performed or were previously performed using subjective human intuition or input. For example, currently there does not exist a technique to automatically generate hash values and bit-strings associated with the product information and/or user information and/or determine a change in the product information and/or the user information based on the hash values and the bit-strings. Finally, automating the process for determining the change, as described herein, conserves computing resources (e.g., processor resources, memory resources, and/or the like) that would otherwise be wasted by a user continually reviewing the product information and/or the user information.

FIGS. 1A-1E are diagrams of an example implementation 100 described herein. In some implementations, example implementation 100 may include a user device (e.g., a mobile phone, a smartphone, a laptop computer, a tablet computer, and/or the like capable of identifying a product), a monitoring platform (e.g., a server device, a data center device, or a similar device capable of determining a change to product information or user information), and/or one or more server devices (e.g., one or more devices capable of receiving, generating, storing, processing, and/or providing product information and/or user information). In some implementations, the user device, the monitoring platform, and/or the one or more server devices may be connected via a network, such as the Internet, an intranet, and/or the like.

In some implementations, the user device may execute one or more applications (e.g., provided by, or associated with, an entity, such as a financial institution (e.g., a bank and/or the like), a seller, a merchant, a distributor, a supplier, and/or the like) to receive, generate, store, process, and/or provide information associated with identifying a product and/or displaying a price of the product and/or other information associated with the product. Some example implementations described herein concern a single user device, but implementations can include any number of user devices interacting concurrently with the monitoring platform.

As shown in FIG. 1A, a user of the user device may cause the user device to execute the one or more applications to shop for a product (e.g., shown as a car in FIG. 1A) and determine a price of the product. As shown by reference number 102, the user device may prompt the user of the user device to identify a product of interest to the user and/or provide user identifying information. For example, the user device may display an instruction for the user to identify the product and/or the user via the one or more applications of the user device. In some implementations, the user device may communicate with the monitoring platform upon executing the one or more applications and the monitoring platform may send a request to the user device for information, which causes the user device to prompt the user of the user device to identify the product of interest and/or provide the user identifying information.

As shown by reference number 104, the user may enter and/or select information that identifies the product and/or the user (e.g., via the one or more applications of the user device). For example, the user may select information that identifies the product (e.g., FIG. 1A shows the user selecting an image of the product) and enter information that identifies the user (e.g., a username, a password, an authentication code, and/or the like) via a user interface of the user device, such as a user interface provided by the one or more applications. In some implementations, the user device may present (e.g., via the one or more applications) a list of products and/or images of the products, and the user may select the product by clicking (e.g., via an interface of the user device) on the product in the list and/or the image of the product.

In some implementations, the user may input a command into the user device for the user device to capture an image of the product (e.g., by using a camera of the user device). In some implementations, the user may point the camera of the user device at the product to capture preview images of the product and the user device may identify the product (e.g., by using an object recognition technique on the preview images) and automatically capture the image of the product after a threshold period of time. In some implementations, the user device may input a command into the user device for the user device to capture an image of an identification string, a bar code, a quick response (QR) code, and/or the like associated with product to identify the product. For example, for a vehicle, the user device may capture an image of vehicle identification number (VIN) to identify the vehicle. In some implementations, the image may include image data concerning the product. In some implementations, the user device may process the image data to identify the product. In some implementations, the user may cause the user device to capture an image of the product and may enter and/or select information that identifies the product. In some implementations, after the user identifies the product by interacting with the user interface, the user device may generate a message that indicates the product, the user, the interest of the user in the product, and/or the like. In some implementations, the message indicates that the user is subscribing to updates on information concerning the product, such as a price of the product.

In some implementations, the user device may send the message to the monitoring platform. As shown by reference number 106, the monitoring platform may obtain (e.g., receive, fetch, and/or the like) the message from the user device via the network. In some implementations, the monitoring platform may parse the message to identify the product, the user, the interest of the user in the product, and/or the like. In some implementations, where the monitoring platform communicates with a plurality of user devices, the monitoring platform may obtain a plurality of messages concerning a plurality of interests of a plurality of users in a plurality of products. In some implementations, a message, of the plurality of messages, indicates an interest, of the plurality of interests, of a user, of the plurality of users, in a product of the plurality of products.

Figure 1B:
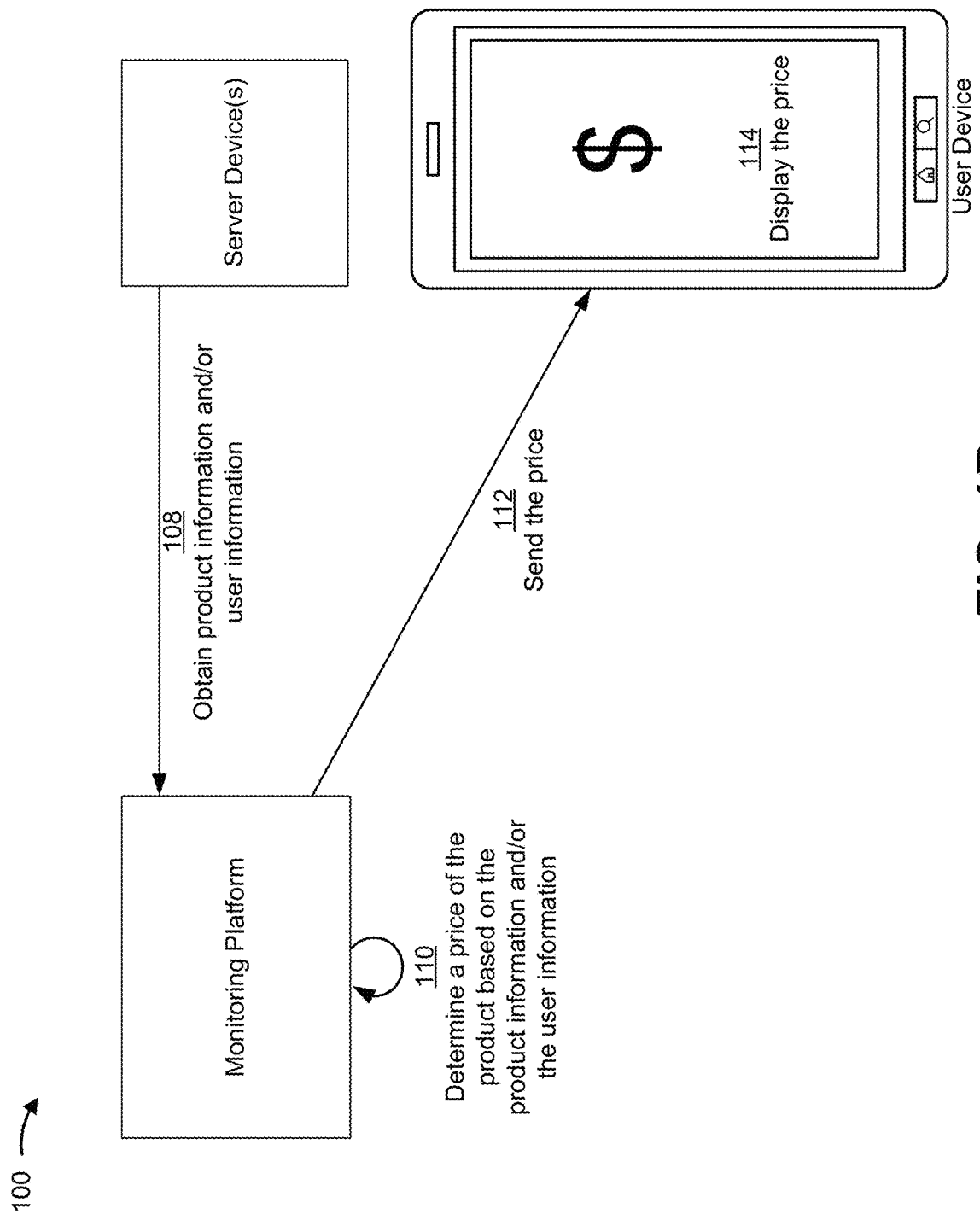

As shown by FIG. 1B and reference number 108, the monitoring platform may communicate with one or more server devices via the network to obtain (e.g., receive, fetch, and/or the like) product information concerning the product and/or user information concerning the user from the one or more server devices. For example, the monitoring platform may send a first signal to a first server of the one or more servers (e.g., a server associated with a merchant that sells the product) for the first server to send the product information to the monitoring platform. As another example, the monitoring platform may send a second signal to a second server of the one or more servers (e.g., a server associated with a financial institution that provides financial services to the user) for the second server to send the user information to the monitoring platform. In some implementations, the monitoring platform may obtain data from one or more data structures of the one or more server devices and parse the data to identify the product information and/or the user information.

In some implementations, the product information concerns one or more attributes of the product. For example, where the product is a vehicle, the one or more attributes may include: a make of the vehicle, a model of the vehicle, a model year of the vehicle, a trim of the vehicle, a body style of the vehicle, a mileage of the vehicle, a condition of the vehicle, a status of the vehicle, an accident history of the vehicle, a location of the vehicle, a seller of the vehicle, a possession term of the vehicle, an identification string of the vehicle, and/or the like. In some implementations, the product information may include a price of the product. In some implementations, the price may include a lump sum amount, a financing amount, a financing rate, a financing term, a financing interest rate, a payment frequency, and/or the like (e.g., terms and conditions associated with a loan, a mortgage, a promissory note, an IOU, and/or the like). In some implementations, the product information may include information that is relevant to determining the price of the product.

In some implementations, the user information concerns information of the user, such as financial-related information of the user. For example, the user information may concern a salary of the user, an employment status of the user, an address of the user, a bankruptcy status of the user, a credit score of the user, a credit history of the user, and/or the like. In some implementations, the user information may include information that is relevant to determining the price of the product.

Additionally, or alternatively, as shown by reference number 110, the monitoring platform may determine the price of the product based on the product information and/or the user information. In some implementations, the monitoring platform may process the product information and/or the user information using a machine learning model, a machine learning technique, an artificial intelligence technique, and/or the like to determine the price of the product. For example, the monitoring platform may train the machine learning model based on one or more parameters associated with determining the price of the product, such as the product information, the user information, one or more hash values associated with the product information, one or more hash values associated with the user information, and/or the like. The monitoring platform may train the machine learning model using historical data associated with determining the price of the product according to the one or more parameters. Using the historical data and the one or more parameters as inputs to the machine learning model, the monitoring platform may determine the price of the product.

As shown by reference number 112, the monitoring platform may send, provide, and/or the like the price to the user device. In some implementations, the one or more server devices may send, provide, and/or the like the price to the user device. For example, the first server of the one or more servers (e.g., the server associated with the merchant that sells the product) may send the price to the user device. As shown by reference number 114, the user device may receive the price and display the price. In some implementations, the monitoring platform and/or the one or more server devices may cause the user device to display the price by sending the price to the user device. In some implementations, the user device may generate an overlay (e.g., an augmented reality (AR) overlay) that indicates the price and display the overlay with the image of the product (e.g., with the overlay superimposed on the image of the product). In some implementations, the monitoring platform may generate a message that includes the price and/or information identifying the product to the user device. In some implementations, the monitoring platform may send the message to the user device, where receiving the message by the user device causes the user device to display the price and/or the information identifying the product via the one or more applications of the user device.

Figure 1C:
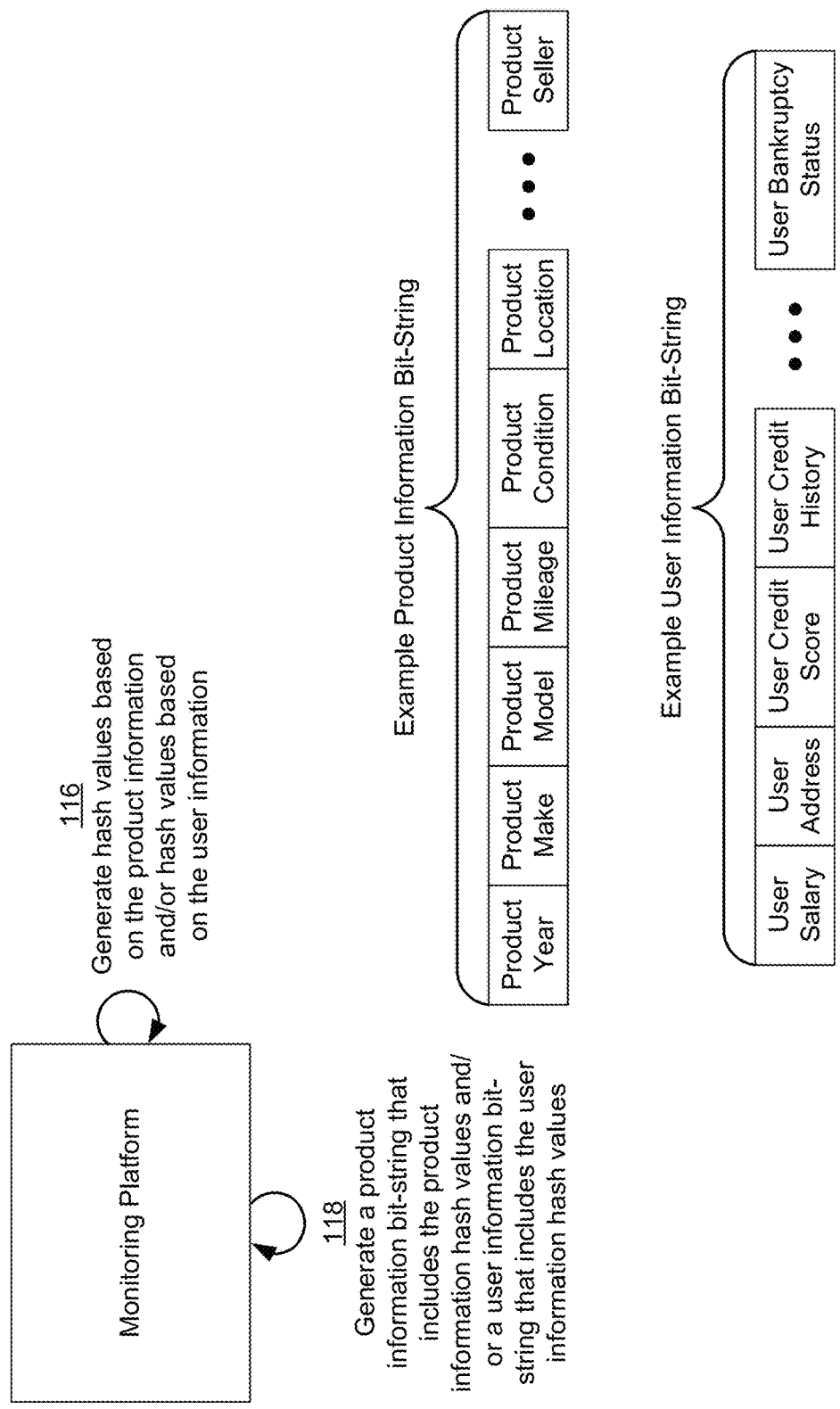

As shown in FIG. 1C and by reference number 116, the monitoring platform may generate one or more hash values based on the product information (e.g., "one or more product information hash values") and/or one or more hash values based on the user information (e.g., "one or more user information hash values"). For example, the monitoring platform may use a hashing function, such as a Jenkins hash function, a Pearson hashing function, a Bernstein hashing function, a Fowler-Noll-Vo hashing function, a Zobrist hashing function, and/or the like to process the product information to generate the one or more product information hash values and/or to process the user information to generate the one or more user information hash values. In some implementations, the hashing function may be optimized to encode proximity of categorical entities to one another in a meaningful space. For example, the hashing function may generate one or more product information hash values concerning a geographical attribute of a product in such a manner that a geographical relationship (e.g., between Oklahoma and Texas) may be more meaningful than an alphabetical relationship (e.g., between Oklahoma and Ohio).

In some implementations, a particular product information hash value of the one or more product information hash values may be associated with a particular attribute of the plurality of attributes of the product. For example, a particular product information hash value may be associated with a particular attribute of the plurality of attributes of the product, such as a product year attribute, a product make attribute, a product model attribute, a product mileage attribute, a product condition attribute, a product location attribute, a product seller attribute, and/or the like. In some implementations, a particular user information hash value of the one or more user hash values may be associated with particular information concerning the user. For example, a particular user information hash value may be associated with particular information concerning the user, such as a user salary, a user address, a user credit score, a user credit history, a user bankruptcy status, and/or the like.

In some implementations, the monitoring platform may process information concerning a first attribute of the plurality of attributes of the product using a first hashing function to generate a first product information hash value. The monitoring platform may process information concerning a second attribute of the plurality of attributes of the product using a second hashing function to generate a second product information hash value. In some implementations, the first hashing function and the second hashing function may be different hashing functions. For example, the monitoring platform may process the product make attribute using the first hashing function and the product location attribute using the second hashing function. In some implementations, the first hashing function and the second hashing function are the same hashing function.

As shown by reference number 118, the monitoring platform may generate a product information bit-string that includes the one or more product information hash values and/or a user information bit-string that includes the one or more user information hash values. For example, the monitoring platform may concatenate the one or more product information hash values together to form the product information bit-string. As another example, the monitoring platform may combine the one or more product information hash values together and perform a hashing function on the combination to generate a single product hash value that is represented by the product information bit-string.

In some implementations, the product information bit-string may include the one or more product information hash values and/or one or more unhashed values. For example, FIG. 1C shows an example product information bit-string that includes values related to the product year attribute, the product make attribute, the product model attribute, the product mileage attribute, the product condition attribute, the product location attribute, the product seller attribute, and/or the like. The values can be divided into first values that are related to alphanumeric attributes and second values that related to numeric attributes. For example, the first values may be related to the product make attribute, the product model attribute, the product condition attribute, the product condition attribute, the product seller attribute, and/or other alphanumeric attributes. The second values may be related to the product year attribute, the product mileage attribute, and/or other numeric attributes. The first values may be hashed (e.g., using the hashing process described herein) to generate numeric hash values. Accordingly, the monitoring platform may only perform numeric comparison operations concerning the first values, rather than alphanumeric comparison operations, to determine whether information related to an attribute has changed, which may conserve processing resources, memory resources, power resources, and/or the like of the monitoring platform. Moreover, the second values may be unhashed values (e.g., the monitoring platform did not perform a hashing function to generate the second values) because hashing is unnecessary (e.g., because the second values are already numeric values and numeric comparison operations require minimal resources), which may conserve processing resources, memory resources, power resources, and/or the like of the monitoring platform that would otherwise be expended hashing the second values. In some implementations, one or more unhashed values may be processed to reduce the number of bits needed to represent the one or more unhashed values. For example, the product year attribute may be reduced to two digits (e.g., "18" instead of "2018"), the product mileage attribute may be divided by 1,000 to represent the amount of mileage in thousands of miles, another numeric attribute may be rounded down or up to a unit value, and/or the like.

In some implementations, the user information bit-string may include the one or more user information hash values and/or one or more unhashed values in a similar manner as described herein in relation to the product information bit-string. For example, FIG. 1C shows an example user information bit-string that includes values related to user salary information, user address information, user credit score information, user credit history information, user bankruptcy status information, and/or the like. The values can be divided into first values that are related to alphanumeric information, such as the user address information, the user credit history information, and/or the like, and into second values that are related to numeric information, such as the user salary information, the user credit score information, the user bankruptcy status information, and/or the like. In some implementations, the first values may be hashed values and the second values may be unhashed values.

Figure 1D:
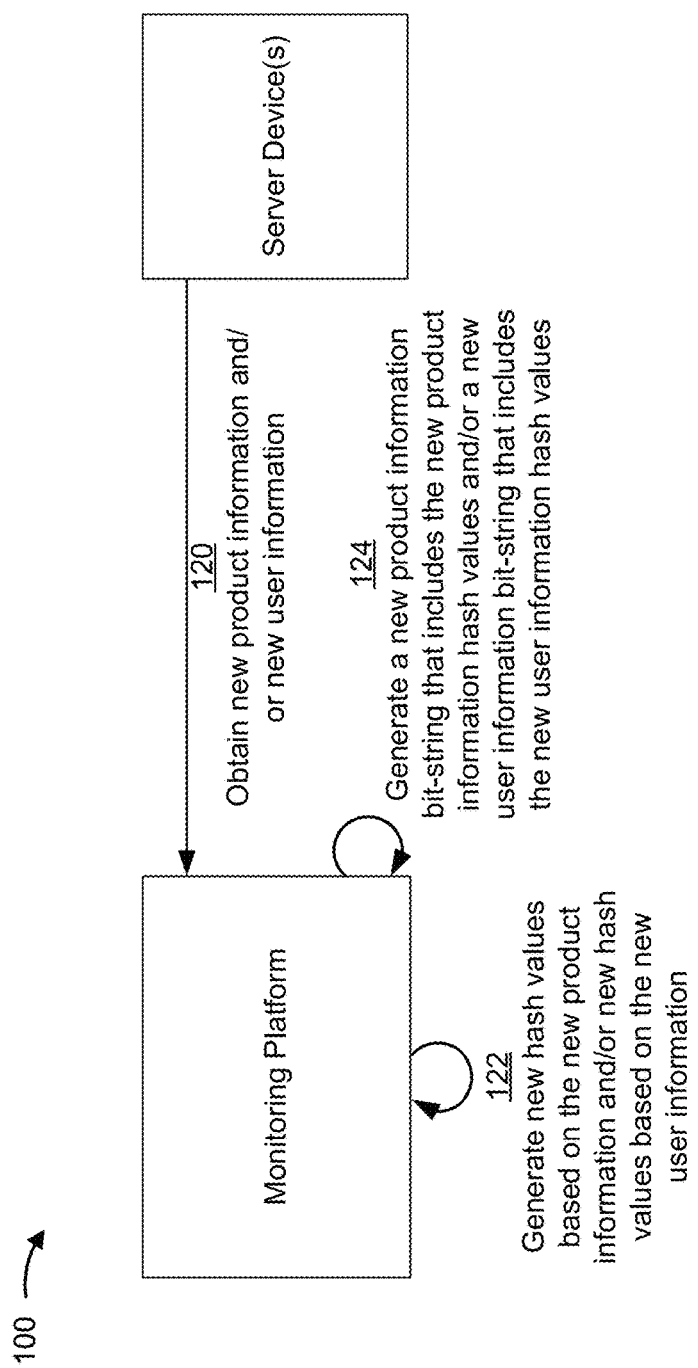

As shown in FIG. 1D and by reference number 120, the monitoring platform may communicate with one or more server devices via the network to obtain (e.g., receive, fetch, and/or the like) new product information concerning the product and/or new user information concerning the user from the one or more server devices in a similar manner as described herein in relation to FIG. 1B. In some implementations, the one or more server devices may send the new product information and/or the new user information to the monitoring platform upon a change in the new product information and/or the new user information. In some implementations, the monitoring platform may obtain new data from the data structure of the one or more server devices and parse the new data to identify the new product information and/or the new user information. In some implementations, the monitoring platform may fetch the new product information and/or the new user information from the one or more server devices upon a trigger event (e.g, a scheduled time after determining the price (e.g., one day after, 36 hours after, one week after, one month after, and/or the like), the user device sending a signal to the monitoring platform for a price update, the user device sending a signal to the monitoring platform indicating that the user is trying to finalize purchase of the product, and/or the like). In some implementations, the new product information concerns the one or more attributes of the product. In some implementations, the new user information concerns the information of the user, such as the financial-related information of the user.

As shown by reference number 122, the monitoring platform may generate one or more new hash values based on the new product information (e.g., "one or more new product information hash values") and/or one or more new hash values based on the new user information (e.g., "one or more new user information hash values") in a similar manner as described herein in relation to FIG. 1C. For example, the monitoring platform may use a hashing function to process the new product information to generate the one or more new product information hash values and/or to process the new user information to generate the one or more new user information hash values. In some implementations, a particular new product information hash value of the one or more new product information hash values may be associated with the particular attribute of the plurality of attributes of the product. In some implementations, a particular new user information hash value of the one or more new user hash values may be associated with the particular information concerning the user.

In some implementations, the monitoring platform may process the information concerning the first attribute of the plurality of attributes of the product using the first hashing function (e.g., the same hashing function used to generate the first product information hash value) to generate a first new product information hash value. The monitoring platform may process the information concerning the second attribute of the plurality of attributes of the product using the second hashing function (e.g., the same hashing function used to generate the second product information hash value) to generate a second new product information hash value.

As shown by reference number 124, the monitoring platform may generate a new product information bit-string that includes the one or more new product information hash values and/or a new user information bit-string that includes the one or more new user information hash values in a similar manner as described herein in relation to FIG. 1C. In some implementations, the new product information bit-string may include the one or more new product information hash values and/or one or more new unhashed values. In some implementations, the new product information bit-string may include the one or more new product information hash values and/or the one or more new unhashed values in the same compositional order as the product information bit-string that includes the one or more product information hash values and the one or more unhashed values. In some implementations, the new user information bit-string may include the one or more new user information hash values and/or one or more new unhashed values. In some implementations, the new user information bit-string may include the one or more new user information hash values and/or the one or more new unhashed values in the same compositional order as the user information bit-string that includes the one or more product user hash values and the one or more unhashed values.

Figure 1E:
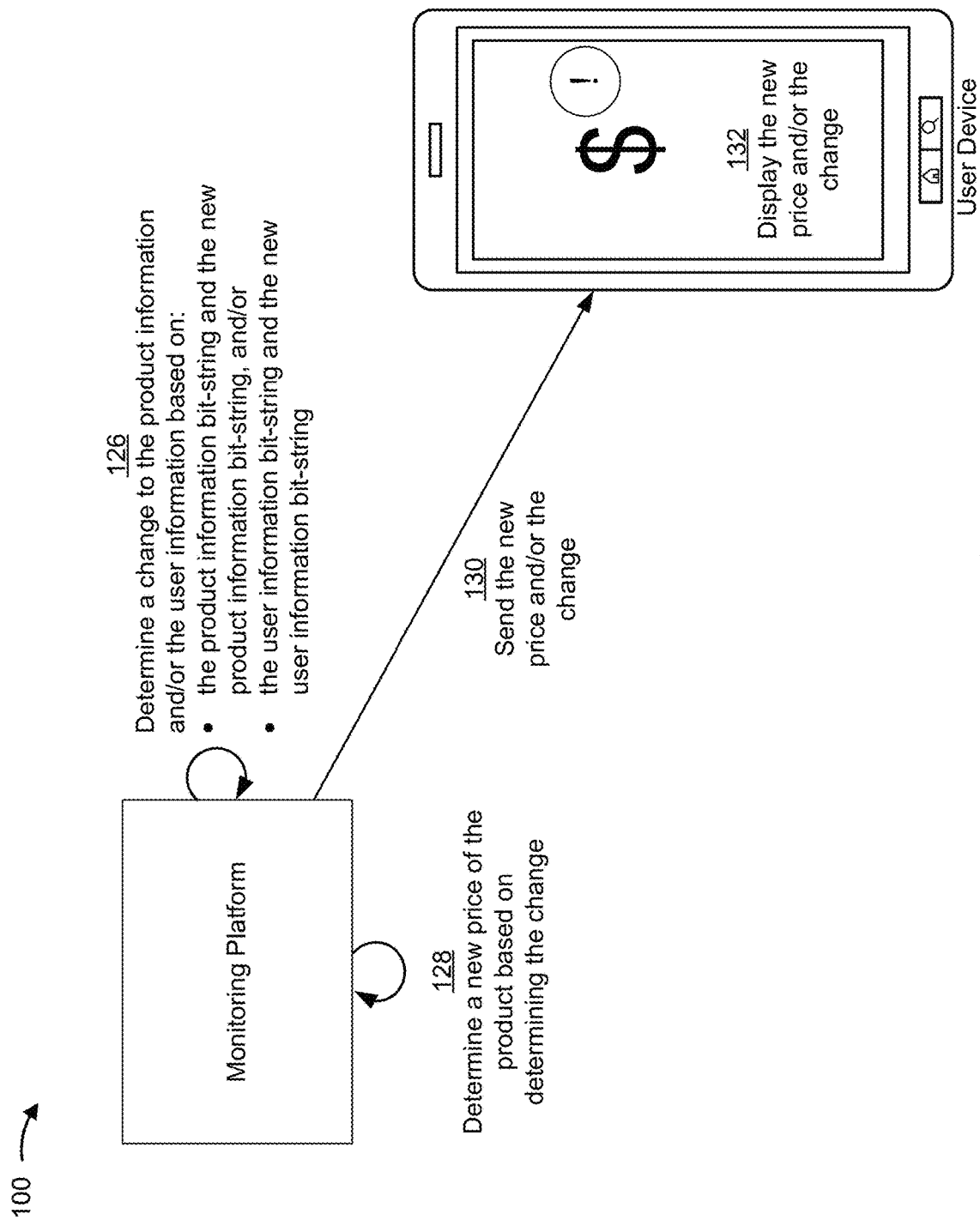

As shown in FIG. 1E and by reference number 126, the monitoring platform may determine a change to the product information based on the product information bit-string and the new product information bit-string, and/or a change to the user information based on the user information bit-string and the new user information bit-string. For example, the monitoring platform may determine and/or identify a change to the particular attribute of the plurality of attributes of the product based on the product information bit-string and the new product information bit-string (e.g., by comparing the particular product information hash value of the product information bit-string and the particular new product information hash value of the new product information bit-string). As another example, the monitoring platform may determine and/or identify a significant change to the particular attribute of the plurality of attributes of the product (e.g., a change to product mileage that exceeds 1,000 miles) based on the product information bit-string and the new product information bit-string (e.g., by comparing a significant bit or bits of the particular product information hash value of the product information bit-string and a significant bit or bits of the particular new product information hash value of the new product information bit-string). In some implementations, the monitoring platform may determine and/or identify a change to the particular information concerning the user based on the user information bit-string and the new user information bit-string (e.g., by comparing the particular user information hash value of the user information bit-string and the particular new user information hash value of the new user information bit-string).

In some implementations, the monitoring platform may compare the first product information hash value of the product information bit-string and the first new product information hash value of the new product information bit-string to identify and/or determine whether there is a first change to the first attribute of the plurality of attributes. In some implementations, the monitoring platform may compare the second product information hash value of the product information bit-string and the second new product information hash value of the new product information bit-string to identify and/or determine whether there is a second change to the second attribute of the plurality of attributes.

As shown by reference number 128, the monitoring platform may determine a new price of the product based on determining a change to the product information and/or the user information. For example, based on determining the change to the product information and/or the user information, the monitoring platform may process the product information, the new product information, the user information, the new user information, and/or the like using the machine learning model, the machine learning technique, the artificial intelligence technique, and/or the like to determine the new price of the product. In some implementations, based on determining the change to the product information and/or the user information, the monitoring platform may process the product information bit-string, the new product information bit-string, the user information bit-string, and/or the new user information bit-string to determine the new price of the product. For example, based on determining the change to the product information and/or the user information, the monitoring platform may process the product information bit-string, the new product information bit-string, the user information bit-string, and/or the new user information bit-string using the machine learning model, the machine learning technique, the artificial intelligence technique, and/or the like to determine the new price of the product.

In some implementations, the monitoring platform may determine the new price of the product based on a change to the first attribute, the second attribute, and/or the particular attribute of the plurality of attributes of the product. In some implementations, the monitoring platform may determine the new price of the product based on a change to the particular information concerning the user. In some implementations, the new price of the product may be different than the price of the product (e.g., the change to the first attribute, the second attribute, and/or the particular attribute of the plurality of attributes of the product, the change to the particular information concerning the user, and/or the like, affected the price of the product). In some implementations, the new price of the product may be the same as the price of the product (e.g., the change to the first attribute, the second attribute, and/or the particular attribute of the plurality of attributes of the product, the change to the particular information concerning the user, and/or the like, did not affect the price of the product).

In some implementations, the monitoring platform may perform an automatic action based on the new price of the product. For example, the monitoring platform may automatically purchase the product at the new price. As another example, the monitoring platform may submit an order for the product at the new price. In some implementations, the order may be cancellable by the user for a period of time (e.g., 6 hours, 1 day, 1 week, and/or the like) before the order is finalized. As a further example, the monitoring platform may automatically finalize financing options (e.g., loan terms) for the product at the new price.

As shown by reference number 130, the monitoring platform may send, provide, and/or the like the new price and/or information indicating the change to the user device in a similar manner as described herein in relation to FIG. 1B. For example, the monitoring platform may determine that the user device has subscribed to updates on information concerning the product and the new price and/or information indicating the change to the user device. As shown by reference number 132, the user device may receive the new price and/or the change and display the new price and/or the change in a similar manner as described herein in relation to FIG. 1B. In some implementations, the monitoring platform may cause the user device to display the new price and/or the change by sending the new price and/or the change to the user device. In some implementations, the monitoring platform may generate a message that includes the new price, the change, information regarding the change, and/or the like to the user device. In some implementations, the monitoring platform may send the message to the user device, where receiving the message by the user device causes the user device to display the new price, the change, the information regarding the change, a symbol indicating the change and/or the like.

As indicated above, FIGS. 1A-1E are provided merely as examples. Other examples are possible and may differ from what was described with regard to FIGS. 1A-1E.

Figure 2:
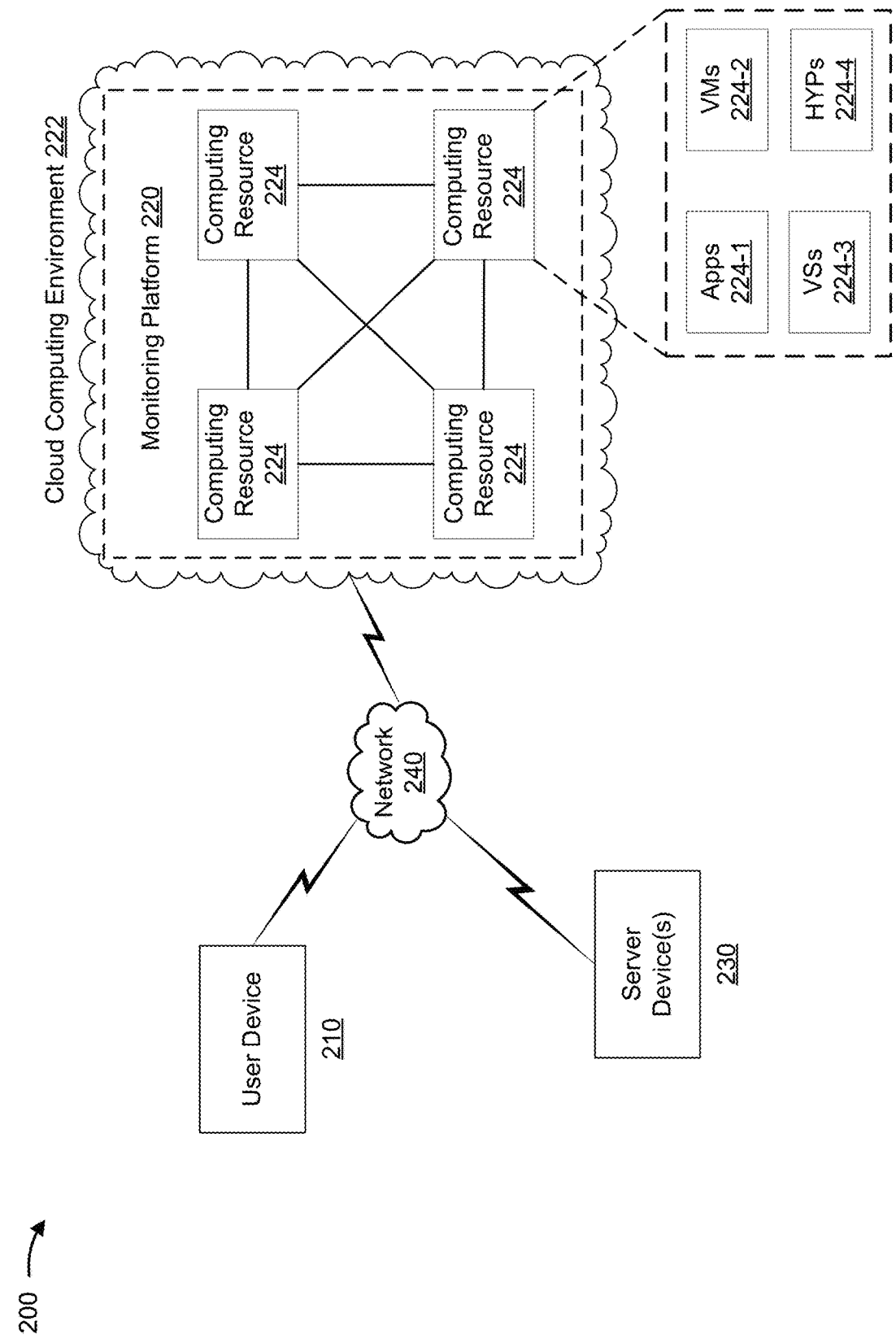
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a monitoring platform 220 in a cloud computing environment 222 that includes a set of computing resources 224, one or more server devices 230 (referred to individually as server device 230), and a network 240. Devices of environment 200 may interconnect via wired connections, wireless connections, or a combination of wired and wireless connections.

User device 210 includes one or more devices capable of receiving, generating, storing, processing, and/or providing information associated with identifying a product and/or displaying a price of the product and/or other information associated with the product. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may provide a product identification to monitoring platform 220, may receive a price of the product from monitoring platform 220, may provide new product information to monitoring platform 220, may receive a new price of the product or other information associated with the product from monitoring platform 220, and/or the like.

Monitoring platform 220 includes one or more devices, such as a server device (e.g., a host server, a web server, an application server, etc.), a data center device, or a similar device capable of determining a change to product information or user information via hashing. In some implementations, monitoring platform 220 may be designed to be modular such that certain software components may be swapped in or out depending on a particular need. As such, monitoring platform 220 may be easily and/or quickly reconfigured for different uses.

In some implementations, monitoring platform 220 may receive information from and/or transmit information to user device 210. For example, monitoring platform 220 may send a request for a product identification to user device 210, may receive the product identification from user device 210, may obtain product information and/or user information from one or more server devices 230, may determine a price of the product based on the product information and/or the user information, may send the price to user device 210, may generate hash values based on the product information and/or hash values based on the user information, may generate a product information bit-string that includes the product information hash values and/or a user information bit-string that includes the user information hash values, may obtain new product information and/or new user information from one or more server devices 230, may generate new hash values based on the new product information and/or new hash values based on the new user information, may generate a new product information bit-string that includes the new product information hash values and/or a new user information bit-string that includes the new user information hash values, may determine a change to the product information based on the product information bit-string and the new product information bit-string and/or a change to the user information based on the user information bit-string and the new user information bit-string, may determine a new price of the product based on determining the change, may send the new price and/or the change to the user device 210, and/or the like.

In some implementations, as shown, monitoring platform 220 may be hosted in a cloud computing environment 222. Notably, while implementations described herein describe monitoring platform 220 as being hosted in cloud computing environment 222, in some implementations, monitoring platform 220 may not be cloud-based (i.e., may be implemented outside of a cloud computing environment) or may be partially cloud-based.

Cloud computing environment 222 includes an environment that hosts monitoring platform 220. Cloud computing environment 222 may provide computation, software, data access, storage, etc. services that do not require end-user knowledge of a physical location and configuration of system(s) and/or device(s) that hosts monitoring platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host monitoring platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with monitoring platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of monitoring platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Server device 230 includes one or more devices capable of receiving, storing, generating, and/or processing product information and/or user information, and/or the like, and/or providing the product information and/or user information to user device 210. For example, server device 230 may include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a communications network, a telecommunications network, a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
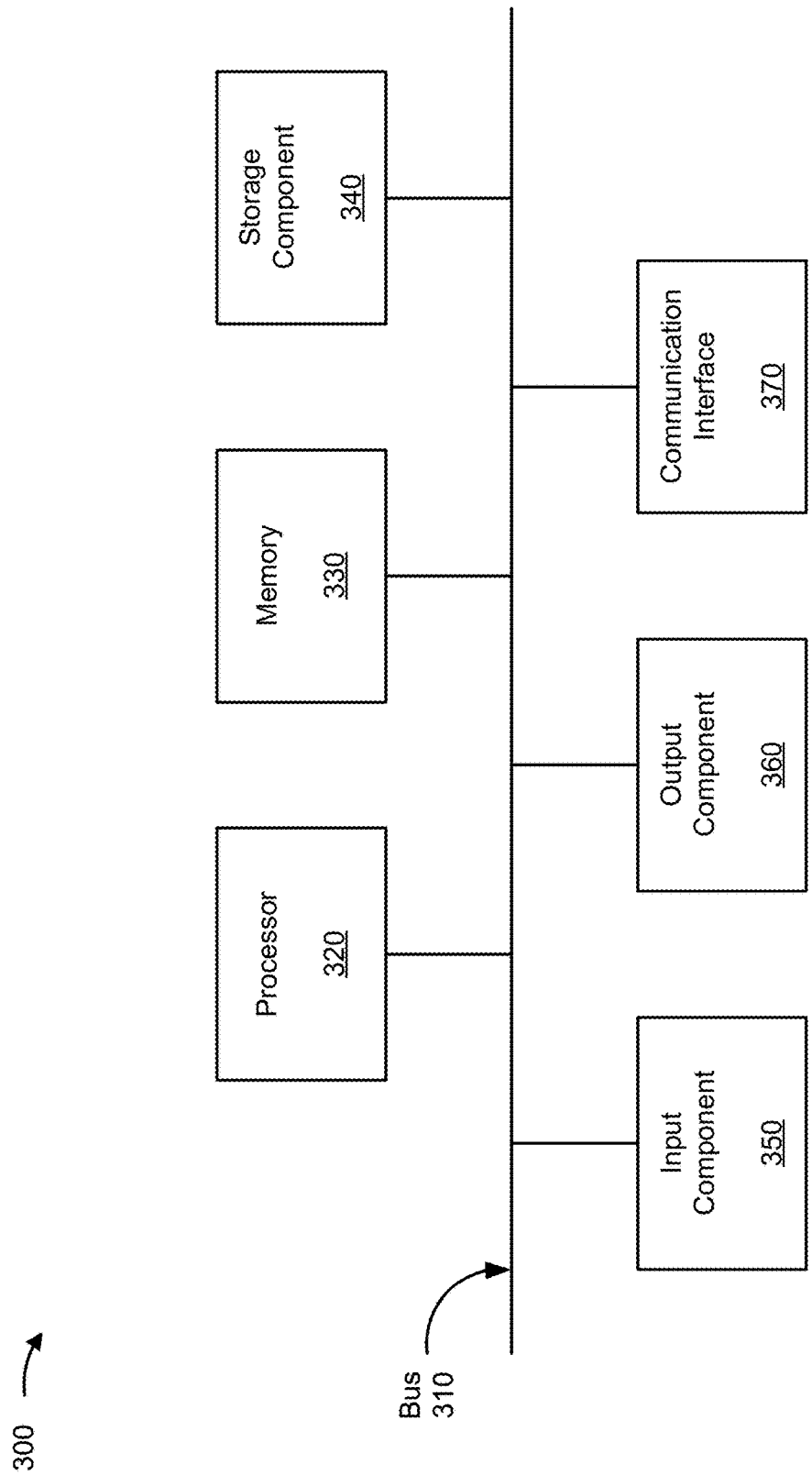
FIG. 3 is a diagram of example components of one or more devices of FIG. 2.

FIG. 3 is a diagram of example components of a device 300. Device 300 may correspond to user device 210, monitoring platform 220, computing resource 224, and/or server device 230. In some implementations, user device 210, monitoring platform 220, computing resource 224, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
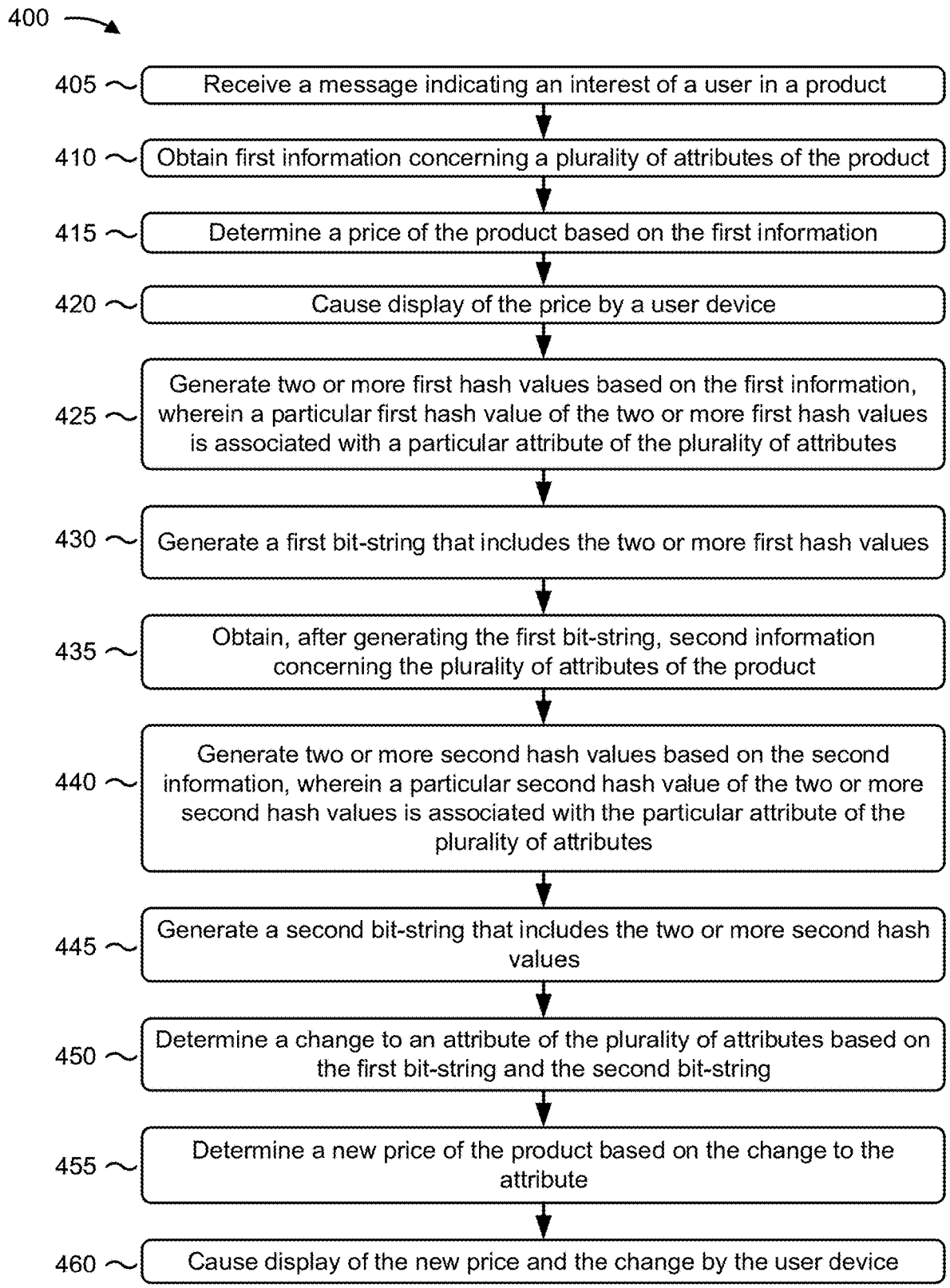
FIG. 4 is a flow chart of an example process for determining a change to product information or user information via hashing.

FIG. 4 is a flow chart of an example process 400 for determining a change to product information or user information via hashing. In some implementations, one or more process blocks of FIG. 4 may be performed by a monitoring platform (e.g., monitoring platform 220). In some implementations, one or more process blocks of FIG. 4 may be performed by another device or a group of devices separate from or including the monitoring platform, such as a user device (e.g., user device 210), a server device (e.g., server device 230), and/or the like.

As shown in FIG. 4, process 400 may include receiving a message indicating an interest of a user in a product (block 405). For example, the monitoring platform (e.g., using computing resource 224, processor 320, memory 330, storage component 340, input component 350, communication interface 370, and/or the like) may receive a message indicating an interest of a user in a product, as described above in connection with FIGS. 1A-1E.

As further shown in FIG. 4, process 400 may include obtaining first information concerning a plurality of attributes of the product (block 410). For example, the monitoring platform (e.g., using computing resource 224, processor 320, memory 330, storage component 340, input component 350, communication interface 370, and/or the like) may obtain first information concerning a plurality of attributes of the product, as described above in connection with FIGS. 1A-1E.

As further shown in FIG. 4, process 400 may include determining a price of the product based on the first information (block 415). For example, the monitoring platform (e.g., using computing resource 224, processor 320, memory 330, storage component 340, and/or the like) may determine a price of the product based on the first information, as described above in connection with FIGS. 1A-1E.

As further shown in FIG. 4, process 400 may include causing display of the price by a user device (block 420). For example, the monitoring platform (e.g., using computing resource 224, processor 320, memory 330, storage component 340, output component 360, communication interface 370, and/or the like) may cause display of the price by a user device, as described above in connection with FIGS. 1A-1E.

As further shown in FIG. 4, process 400 may include generating two or more first hash values based on the first information, wherein a particular first hash value of the two or more first hash values is associated with a particular attribute of the plurality of attributes (block 425). For example, the monitoring platform (e.g., using computing resource 224, processor 320, memory 330, storage component 340, and/or the like) may generate two or more first hash values based on the first information, as described above in connection with FIGS. 1A-1E. In some implementations, a particular first hash value of the two or more first hash values may be associated with a particular attribute of the plurality of attributes.

As further shown in FIG. 4, process 400 may include generating a first bit-string that includes the two or more first hash values (block 430). For example, the monitoring platform (e.g., using computing resource 224, processor 320, memory 330, storage component 340, and/or the like) may generate a first bit-string that includes the two or more first hash values, as described above in connection with FIGS. 1A-1E.

As further shown in FIG. 4, process 400 may include obtaining. after generating the first bit-string, second information concerning the plurality of attributes of the product (block 435). For example, the monitoring platform (e.g., using computing resource 224, processor 320, memory 330, storage component 340, input component 350, communication interface 370, and/or the like) may obtain, after generating the first bit-string, second information concerning the plurality of attributes of the product, as described above in connection with FIGS. 1A-1E.

As further shown in FIG. 4, process 400 may include generating two or more second hash values based on the second information, wherein a particular second hash value of the two or more second hash values is associated with the particular attribute of the plurality of attributes (block 440). For example, the monitoring platform (e.g., using computing resource 224, processor 320, memory 330, storage component 340, and/or the like) may generate two or more second hash values based on the second information, as described above in connection with FIGS. 1A-1E. In some implementations, a particular second hash value of the two or more second hash values may be associated with the particular attribute of the plurality of attributes.

As further shown in FIG. 4, process 400 may include generating a second bit-string that includes the two or more second hash values (block 445). For example, the monitoring platform (e.g., using computing resource 224, processor 320, memory 330, storage component 340, and/or the like) may generate a second bit-string that includes the two or more second hash values, as described above in connection with FIGS. 1A-1E.

As further shown in FIG. 4, process 400 may include determining a change to an attribute of the plurality of attributes based on the first bit-string and the second bit-string (block 450). For example, the monitoring platform (e.g., using computing resource 224, processor 320, memory 330, storage component 340, and/or the like) may determine a change to an attribute of the plurality of attributes based on the first bit-string and the second bit-string, as described above in connection with FIGS. 1A-1E.

As further shown in FIG. 4, process 400 may include determining a new price of the product based on the change to the attribute (block 455). For example, the monitoring platform (e.g., using computing resource 224, processor 320, memory 330, storage component 340, and/or the like) may determine a new price of the product based on the change to the attribute, as described above in connection with FIGS. 1A-1E.

As further shown in FIG. 4, process 400 may include causing display of the new price and the change by the user device (block 460). For example, the monitoring platform (e.g., using computing resource 224, processor 320, memory 330, storage component 340, output component 360, communication interface 370, and/or the like) may cause display of the new price and the change by the user device, as described above in connection with FIGS. 1A-1E.

Process 400 may include additional implementations, such as any single implementation or any combination of implementations described below and/or in connection with one or more other processes described elsewhere herein.

In some implementations, the product may be a vehicle, and the plurality of attributes may include at least two of a make of the vehicle, a model of the vehicle, a model year of the vehicle, a trim of the vehicle, a body style of the vehicle, a mileage of the vehicle, a condition of the vehicle, a status of the vehicle, an accident history of the vehicle, a location of the vehicle, a seller of the vehicle, a possession term of the vehicle, or an identification string of the vehicle.

In some implementations, when receiving the message indicating the interest of the user in the product, the monitoring platform may receive the message from the user device, where the message was generated based on the user interacting with an application of the user device. In some implementations, when obtaining the first information concerning the plurality of attributes of the product, the monitoring platform may obtain data regarding the product from a data structure, and may parse the data to identify the first information, where the first information includes information that is relevant to determining the price of the product.

In some implementations, when determining the price of the product based on the first information, the monitoring platform may process the first information using a machine learning model to determine the price of the product. In some implementations, when causing display of the price by the user device, the monitoring platform may send an additional message that includes the price and information identifying the product to the user device, where receiving the additional message by the user device causes the user device to display the price and the information identifying the product through an application of the user device.

In some implementations, when generating the two or more first hash values based on the first information, the monitoring platform may process information concerning the particular attribute using a first hashing function to generate the particular first hash value, and may process information concerning an additional attribute, of the plurality of attributes, using a second hashing function to generate an additional first hash value. Further, in some implementations, when generating the two or more second hash values based on the second information, the monitoring platform may process the information concerning the particular attribute using the first hashing function to generate the particular second hash value, and may process the information concerning the additional attribute using the second hashing function to generate an additional second hash value. In addition, in some implementations, when determining the change to the attribute of the plurality of attributes based on the first bit-string and the second bit-string, the monitoring platform may compare the particular first hash value of the first bit-string and the particular second hash value of the second bit-string, and may compare the additional first hash value of the first bit-string and the additional second hash value of the second bit-string.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
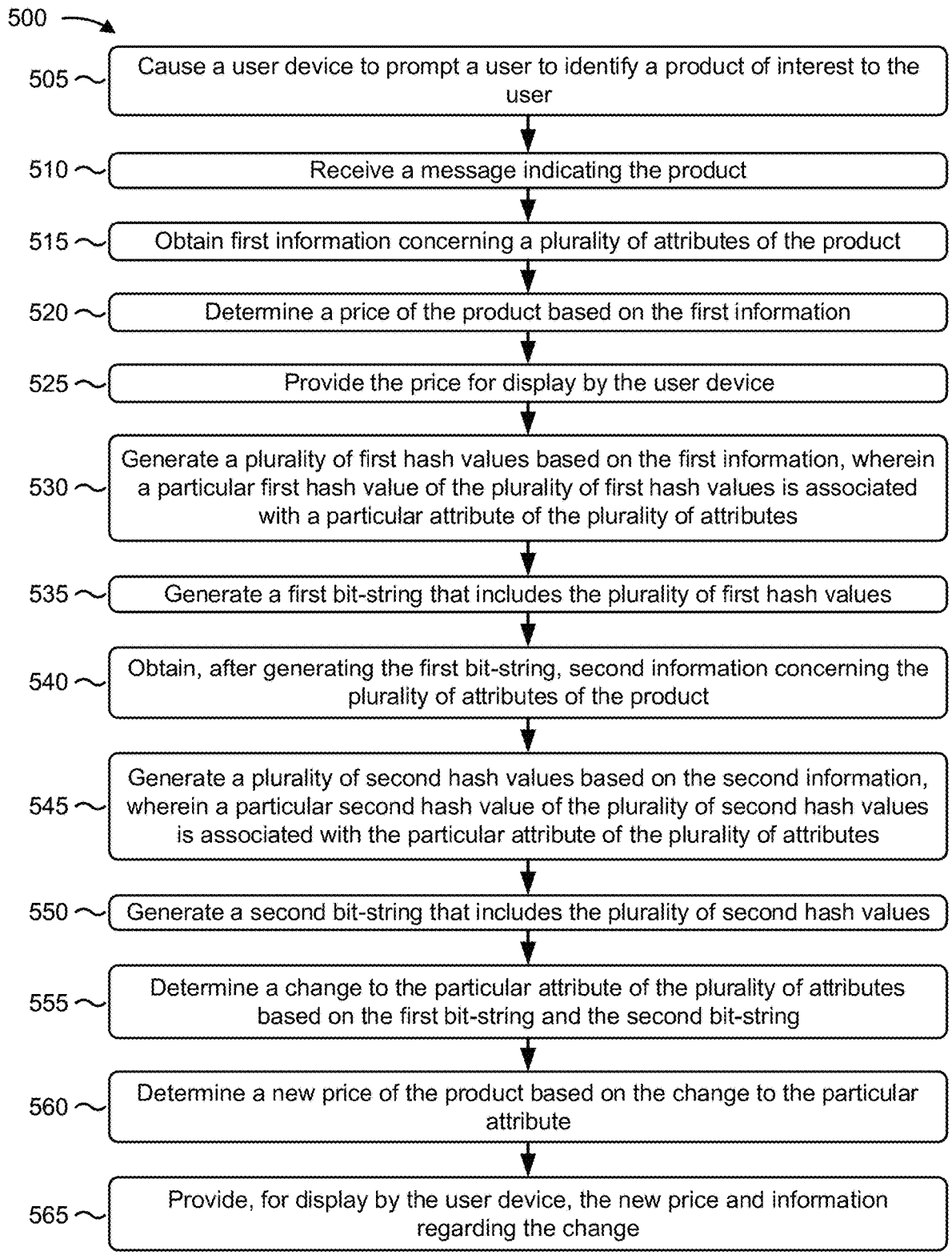
FIG. 5 is a flow chart of an example process for determining a change to product information or user information via hashing.

FIG. 5 is a flow chart of an example process 500 for determining a change to product information or user information via hashing. In some implementations, one or more process blocks of FIG. 5 may be performed by a monitoring platform (e.g., monitoring platform 220). In some implementations, one or more process blocks of FIG. 5 may be performed by another device or a group of devices separate from or including the monitoring platform, such as a user device (e.g., user device 210), a server device (e.g., server device 230), and/or the like.

As shown in FIG. 5, process 500 may include causing a user device to prompt a user to identify a product of interest to the user (block 505). For example, the monitoring platform (e.g., using computing resource 224, processor 320, memory 330, storage component 340, output component 360, communication interface 370, and/or the like) may cause a user device to prompt a user to identify a product of interest to the user, as described above in connection with FIGS. 1A-1E.

As further shown in FIG. 5, process 500 may include receiving a message indicating the product (block 510). For example, the monitoring platform (e.g., using computing resource 224, processor 320, memory 330, storage component 340, input component 350, communication interface 370, and/or the like) may receive a message indicating the product, as described above in connection with FIGS. 1A-1E.

As further shown in FIG. 5, process 500 may include obtaining first information concerning a plurality of attributes of the product (block 515). For example, the monitoring platform (e.g., using computing resource 224, processor 320, memory 330, storage component 340, input component 350, communication interface 370, and/or the like) may obtain first information concerning a plurality of attributes of the product, as described above in connection with FIGS. 1A-1E.

As further shown in FIG. 5, process 500 may include determining a price of the product based on the first information (block 520). For example, the monitoring platform (e.g., using computing resource 224, processor 320, memory 330, storage component 340, and/or the like) may determine a price of the product based on the first information, as described above in connection with FIGS. 1A-1E.

As further shown in FIG. 5, process 500 may include providing the price for display by the user device (block 525). For example, the monitoring platform (e.g., using computing resource 224, processor 320, memory 330, storage component 340, output component 360, communication interface 370, and/or the like) may provide the price for display by the user device, as described above in connection with FIGS. 1A-1E.

As further shown in FIG. 5, process 500 may include generating a plurality of first hash values based on the first information, wherein a particular first hash value of the plurality of first hash values is associated with a particular attribute of the plurality of attributes (block 530). For example, the monitoring platform (e.g., using computing resource 224, processor 320, memory 330, storage component 340, and/or the like) may generate a plurality of first hash values based on the first information, as described above in connection with FIGS. 1A-1E. In some implementations, a particular first hash value of the plurality of first hash values may be associated with a particular attribute of the plurality of attributes.

As further shown in FIG. 5, process 500 may include generating a first bit-string that includes the plurality of first hash values (block 535). For example, the monitoring platform (e.g., using computing resource 224, processor 320, memory 330, storage component 340, and/or the like) may generate a first bit-string that includes the plurality of first hash values, as described above in connection with FIGS. 1A-1E.

As further shown in FIG. 5, process 500 may include obtaining, after generating the first bit-string, second information concerning the plurality of attributes of the product (block 540). For example, the monitoring platform (e.g., using computing resource 224, processor 320, memory 330, storage component 340, input component 350, communication interface 370, and/or the like) may obtain, after generating the first bit-string, second information concerning the plurality of attributes of the product, as described above in connection with FIGS. 1A-1E.

As further shown in FIG. 5, process 500 may include generating a plurality of second hash values based on the second information, wherein a particular second hash value of the plurality of second hash values is associated with the particular attribute of the plurality of attributes (block 545). For example, the monitoring platform (e.g., using computing resource 224, processor 320, memory 330, storage component 340, and/or the like) may generate a plurality of second hash values based on the second information, as described above in connection with FIGS. 1A-1E. In some implementations, a particular second hash value of the plurality of second hash values may be associated with the particular attribute of the plurality of attributes.

As further shown in FIG. 5, process 500 may include generating a second bit-string that includes the plurality of second hash values (block 550). For example, the monitoring platform (e.g., using computing resource 224, processor 320, memory 330, storage component 340, and/or the like) may generate a second bit-string that includes the plurality of second hash values, as described above in connection with FIGS. 1A-1E.

As further shown in FIG. 5, process 500 may include determining a change to the particular attribute of the plurality of attributes based on the first bit-string and the second bit-string (block 555). For example, the monitoring platform (e.g., using computing resource 224, processor 320, memory 330, storage component 340, and/or the like) may determine a change to the particular attribute of the plurality of attributes based on the first bit-string and the second bit-string, as described above in connection with FIGS. 1A-1E.

As further shown in FIG. 5, process 500 may include determining a new price of the product based on the change to the particular attribute (block 560). For example, the monitoring platform (e.g., using computing resource 224, processor 320, memory 330, storage component 340, and/or the like) may determine a new price of the product based on the change to the particular attribute, as described above in connection with FIGS. 1A-1E.

As further shown in FIG. 5, process 500 may include providing, for display by the user device, the new price and information regarding the change (block 565). For example, the monitoring platform (e.g., using computing resource 224, processor 320, memory 330, storage component 340, output component 360, communication interface 370, and/or the like) may provide, for display by the user device, the new price and information regarding the change, as described above in connection with FIGS. 1A-1E.

Process 500 may include additional implementations, such as any single implementation or any combination of implementations described below and/or in connection with one or more other processes described elsewhere herein.

In some implementations, the first bit-string may include the plurality of first hash values and one or more unhashed values. In some implementations, when causing the user device to prompt the user to identify the product of interest to the user, the monitoring platform may send a signal to the user device, where receiving the signal by the user device causes the user device to display an instruction for the user device to identify the product of interest via an application of the user device.

In some implementations, the monitoring platform may obtain third information concerning the user, and the monitoring platform, when determining the price of the product based on the first information, may determine the price of the product based on the first information and the third information, and may generate a plurality of third hash values based on the third information, where a particular third hash value of the plurality of third hash values is associated with particular information concerning the user. Additionally, the monitoring platform may generate a third bit-string that includes the plurality of third hash values, may obtain, after generating the third bit-string, fourth information concerning the user, and may generate a plurality of fourth hash values based on the fourth information, where a particular fourth hash value of the plurality of fourth hash values is associated with the particular information concerning the user. Additionally, the monitoring platform may generate a fourth bit-string that includes the plurality of fourth hash values, and may identify an additional change to the particular information concerning the user based on the third bit-string and the fourth bit-string, and the monitoring platform, when determining the new price of the product based on the change to the particular attribute, may determine the new price of the product based on the first bit-string, the second bit-string, the third bit-string, and the fourth bit-string.

In some implementations, the particular information concerning the user may include a salary of the user, an employment status of the user, an address of the user, a bankruptcy status of the user, a credit score of the user, or a credit history of the user. In some implementations, when determining the price of the product based on the first information, the monitoring platform may process the first information and the third information using a machine learning technique to determine the price of the product.

In some implementations, when determining the new price of the product based on the change to the particular attribute, the monitoring platform may process the first bit-string, the second bit-string, the third bit-string, and the fourth bit-string using a machine learning technique to determine the new price of the product.

In some implementations, when generating the plurality of third hash values based on the third information, the monitoring platform may process the third information using a hashing technique, and the monitoring platform, when generating the plurality of fourth hash values based on the fourth information, may process the fourth information using the hashing technique.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
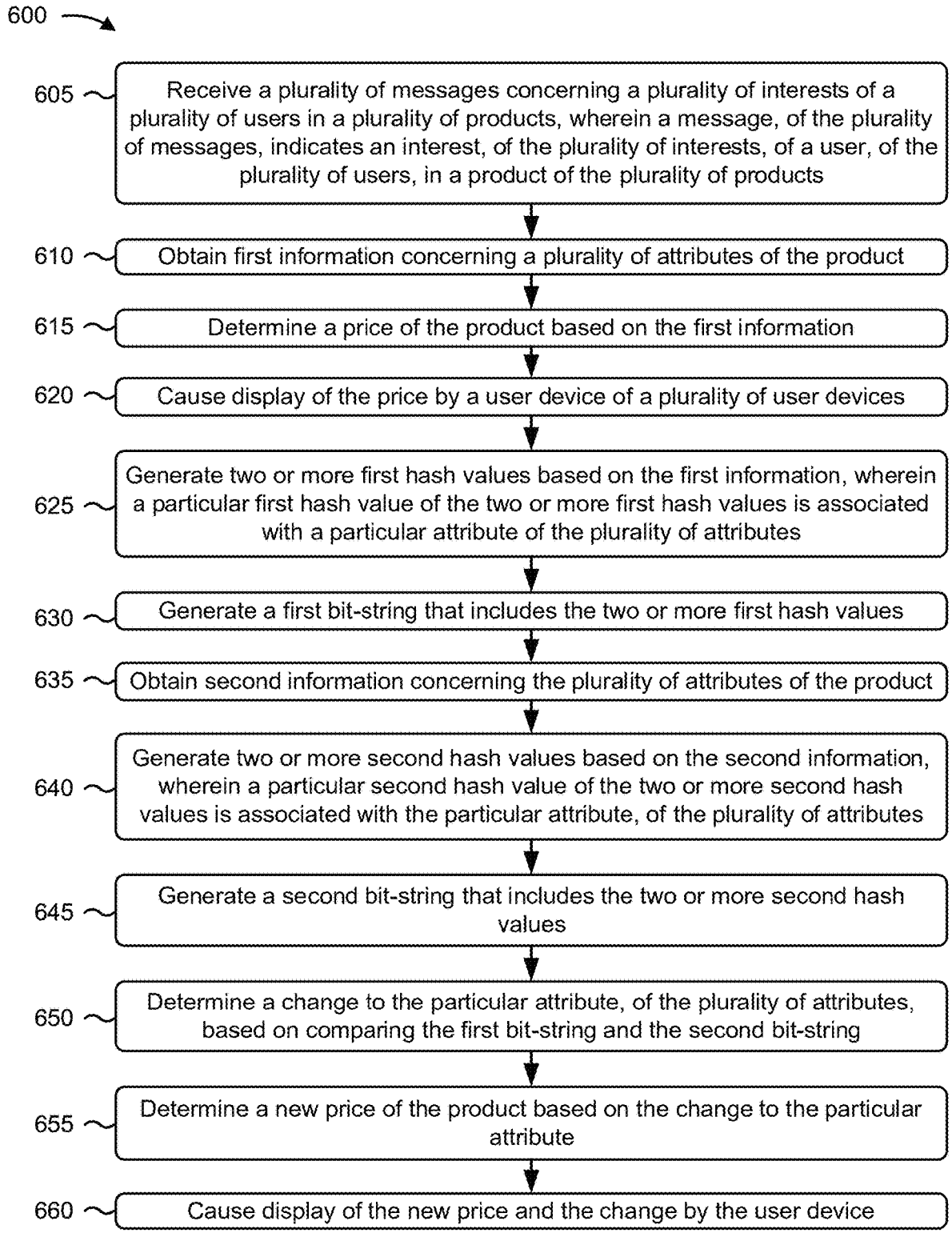
FIG. 6 is a flow chart of an example process for determining a change to product information or user information via hashing.

FIG. 6 is a flow chart of an example process 600 for determining a change to product information or user information via hashing. In some implementations, one or more process blocks of FIG. 6 may be performed by a monitoring platform (e.g., monitoring platform 220). In some implementations, one or more process blocks of FIG. 6 may be performed by another device or a group of devices separate from or including the monitoring platform, such as a user device (e.g., user device 210), a server device (e.g., server device 230), and/or the like.

As shown in FIG. 6, process 600 may include receiving a plurality of messages concerning a plurality of interests of a plurality of users in a plurality of products, wherein a message, of the plurality of messages, indicates an interest, of the plurality of interests, of a user, of the plurality of users, in a product of the plurality of products (block 605). For example, the monitoring platform (e.g., using computing resource 224, processor 320, memory 330, storage component 340, input component 350, communication interface 370, and/or the like) may receive a plurality of messages concerning a plurality of interests of a plurality of users in a plurality of products, as described above in connection with FIGS. 1A-1E. In some implementations, a message, of the plurality of messages, may indicate an interest, of the plurality of interests, of a user, of the plurality of users, in a product of the plurality of products.

As further shown in FIG. 6, process 600 may include obtaining first information concerning a plurality of attributes of the product (block 610). For example, the monitoring platform (e.g., using computing resource 224, processor 320, memory 330, storage component 340, input component 350, communication interface 370, and/or the like) may obtain first information concerning a plurality of attributes of the product, as described above in connection with FIGS. 1A-1E.

As further shown in FIG. 6, process 600 may include determining a price of the product based on the first information (block 615). For example, the monitoring platform (e.g., using computing resource 224, processor 320, memory 330, storage component 340, and/or the like) may determine a price of the product based on the first information, as described above in connection with FIGS. 1A-1E.

As further shown in FIG. 6, process 600 may include causing display of the price by a user device of a plurality of user devices (block 620). For example, the monitoring platform (e.g., using computing resource 224, processor 320, memory 330, storage component 340, output component 360, communication interface 370, and/or the like) may cause display of the price by a user device of a plurality of user devices, as described above in connection with FIGS. 1A-1E.

As further shown in FIG. 6, process 600 may include generating two or more first hash values based on the first information, wherein a particular first hash value of the two or more first hash values is associated with a particular attribute of the plurality of attributes (block 625). For example, the monitoring platform (e.g., using computing resource 224, processor 320, memory 330, storage component 340, and/or the like) may generate two or more first hash values based on the first information, as described above in connection with FIGS. 1A-1E. In some implementations, a particular first hash value of the two or more first hash values may be associated with a particular attribute of the plurality of attributes.

As further shown in FIG. 6, process 600 may include generating a first bit-string that includes the two or more first hash values (block 630). For example, the monitoring platform (e.g., using computing resource 224, processor 320, memory 330, storage component 340, and/or the like) may generate a first bit-string that includes the two or more first hash values, as described above in connection with FIGS. 1A-1E.

As further shown in FIG. 6, process 600 may include obtaining second information concerning the plurality of attributes of the product (block 635). For example, the monitoring platform (e.g., using computing resource 224, processor 320, memory 330, storage component 340, input component 350, communication interface 370, and/or the like) may obtain second information concerning the plurality of attributes of the product, as described above in connection with FIGS. 1A-1E.

As further shown in FIG. 6, process 600 may include generating two or more second hash values based on the second information, wherein a particular second hash value of the two or more second hash values is associated with the particular attribute, of the plurality of attributes (block 640). For example, the monitoring platform (e.g., using computing resource 224, processor 320, memory 330, storage component 340, and/or the like) may generate two or more second hash values based on the second information, as described above in connection with FIGS. 1A-1E. In some implementations, a particular second hash value of the two or more second hash values may be associated with the particular attribute, of the plurality of attributes.

As further shown in FIG. 6, process 600 may include generating a second bit-string that includes the two or more second hash values (block 645). For example, the monitoring platform (e.g., using computing resource 224, processor 320, memory 330, storage component 340, and/or the like) may generate a second bit-string that includes the two or more second hash values, as described above in connection with FIGS. 1A-1E.

As further shown in FIG. 6, process 600 may include determining a change to the particular attribute, of the plurality of attributes, based on comparing the first bit-string and the second bit-string (block 650). For example, the monitoring platform (e.g., using computing resource 224, processor 320, memory 330, storage component 340, and/or the like) may determine a change to the particular attribute, of the plurality of attributes, based on comparing the first bit-string and the second bit-string, as described above in connection with FIGS. 1A-1E.

As further shown in FIG. 6, process 600 may include determining a new price of the product based on the change to the particular attribute (block 655). For example, the monitoring platform (e.g., using computing resource 224, processor 320, memory 330, storage component 340, and/or the like) may determine a new price of the product based on the change to the particular attribute, as described above in connection with FIGS. 1A-1E.

As further shown in FIG. 6, process 600 may include causing display of the new price and the change by the user device (block 660). For example, the monitoring platform (e.g., using computing resource 224, processor 320, memory 330, storage component 340, output component 360, communication interface 370, and/or the like) may cause display of the new price and the change by the user device, as described above in connection with FIGS. 1A-1E.

Process 600 may include additional implementations, such as any single implementation or any combination of implementations described below and/or in connection with one or more other processes described elsewhere herein.

In some implementations, when determining the new price of the product based on the second information, the monitoring platform may process the second information using an artificial intelligence technique to determine the new price of the product. In some implementations, when causing display of the new price and the change by the user device, the monitoring platform may send a display message that includes the new price and the change to the user device, where receiving the display message by the user device causes the user device to display the new price and a symbol indicating the change.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, by a server device, first information concerning user information regarding a user interested in a product, wherein the user information includes information used to determine a price of the product;
    generating, by the server device, a first hash value based on the first information;
    generating a first bit-string that includes the first hash value;
    obtaining, by the server device and after obtaining the first information, second information concerning the user information;
    generating, by the server device, a second hash value based on the second information;
    generating a second bit-string that includes the second hash value;
    determining, by the server device, a change in the user information based on a comparison of the first bit string and the second bit string; and
    causing, by the server device, display information indicating a change in the price of the product by a user device based on the change in the user information.

2. The method of claim 1, where obtaining the first information concerning the user information comprises:
    sending a signal to a server associated with a financial institution that provides financial services to the user.

3. The method of claim 1, wherein the first bit-string includes the first hash value and a first unhashed value and the second bit-string includes the second hash value and a second unhashed value.

4. The method of claim 1, further comprising:
    receiving a message; and
    parsing the message to identify the product and the user.

5. The method of claim 1, wherein the user information includes one or more of:
    financial-related information of the user,
    salary information of the user,
    an employment status of the user,
    a bankruptcy status of the user,
    a credit score of the user, or
    credit history information of the user.

6. The method of claim 1, wherein generating the first hash value based on the first information comprises:
    generating the first hash value using:
        a Jenkins hash function, a Pearson hashing function, a Bernstein hashing function, a Fowler-Noll-Vo hashing function, or
        a Zobrist hashing function.

7. The method of claim 1, wherein the first bit-string that includes the first hashed value based on user credit history information.

8. A device, comprising:
    one or more memories; and
    one or more processors, communicatively coupled to the one or more memories, configured to:
        obtain first information concerning user information regarding a user interested in a product, wherein the user information includes information that is relevant to determining a price of the product;
        generate a first bit-string that includes a first hash value based on the first information;
        obtain, after obtaining the first information, second information concerning the user information;
        generate a second bit-string that includes a second hash value based on the second information;
        determine a change in the user information based on a comparison of the first bit-string and the second bit-string; and
        provide a change in the price of the product to a user device based on the change in the user information.

9. The device of claim 8, wherein the one or more processors, when obtaining the second information, are configured to:
    obtain the second information based on a triggering event.

10. The device of claim 7, wherein the one or more processors, when obtaining the first information concerning the user information, are configured to:
    send a signal to a server associated with a financial institution that provides financial services to the user.

11. The device of claim 8, wherein the one or more processors are further configured to:
    obtain a message to identify the product and identify the user.

12. The device of claim 8, wherein the user information includes one or more of:
    salary information of the user, an employment status of the user,
a bankruptcy status of the user,
a credit score of the user, or
credit history information of the user.

13. The device of claim 8, wherein the one or more processors, when obtaining the second information concerning the user information, are configured to:
   obtain updated user information associated with a marriage status of the user.

14. The device of claim 8, wherein the first bit-string that includes the first hashed value based on user credit history information.

15. A non-transitory computer-readable medium storing instructions, the instructions comprising:
   one or more instructions that, when executed by one or more processors, cause the one or more processors to:
      determine a product of interest to a user;
      obtain first information concerning user information regarding the user, wherein the user information includes information used to determine a price of the product;
      generate a first bit-string based on the first information;
      obtain, after obtaining the first information, second information concerning the user information;
      generate a second bit-string based on the second information;
      determine a change in the user information based on a comparison of the first bit-string and the second bit-string; and
      provide a change in the price of the product to a user device based on the change in the user information.

16. The non-transitory computer-readable medium of claim 15, wherein the one or more instructions, that cause the one or more processors to obtain the first information concerning the user information, cause the one or more processors to:
   send a signal to a server associated with a financial institution that provides financial services to the user.

17. The non-transitory computer-readable medium of claim 15, wherein the one or more instructions, that cause the one or more processors to determine the product of interest to the user, cause the one or more processors to:
   parse a message to identify the product and identify the user.

18. The non-transitory computer-readable medium of claim 15, wherein the one or more instructions, that cause the one or more processors to determine the product of interest to the user, cause the one or more processors to:
   receive a message identifying the product and the user.

19. The non-transitory computer-readable medium of claim 15, wherein the one or more instructions, cause the one or more processors to:
   purchase the product based on the change in price of product.

20. The non-transitory computer-readable medium of claim 15, wherein the first bit-string includes a first hash value and a first unhashed value and the second bit-string includes a second hash value and a second unhashed value.

* * * * *